Feb. 23, 1943.  R. O. THOMAS  2,311,886
THERMOCOUPLE ASSEMBLY
Filed June 27, 1939
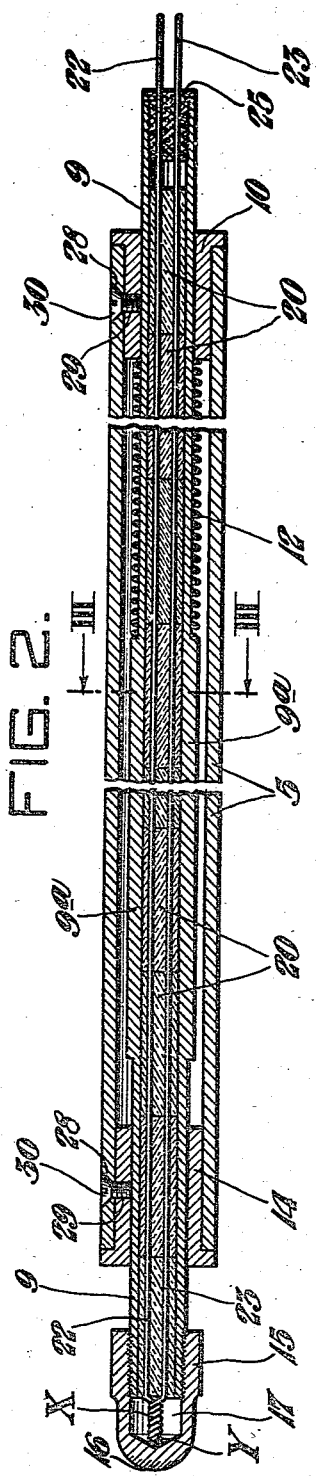
Inventor:
ROBERT O. THOMAS,
by John E. Jackson
his Attorney.

Patented Feb. 23, 1943

2,311,886

UNITED STATES PATENT OFFICE.

2,311,886

THERMOCOUPLE ASSEMBLY

Robert O. Thomas, Munhall, Pa.

Application June 27, 1939, Serial No. 281,451

1 Claim. (Cl. 136—4)

This invention relates to thermocouple assemblies, and more particularly to one which is adapted for use in connection with rotating test objects, such as shafts, turbine forgings and other rotors.

In the manufacture of steam turbine rotor forgings, by way of example, each forging must be successfully subjected to a "heat indication test" to determine its stability and freedom from distortion when subjected to elevated temperatures, thereby insuring an even running balance during changes in steam temperatures and loads. Such a test requires that the rotor be heated during rotation until the specified maximum temperature has been reached. This is usually carried out by placing the rotor in a suitable lathe and erecting around the rotor a temporary furnace. During the testing, periodic readings are taken, for example, at hourly intervals at which time the diametric expansion and surface temperatures are measured. Ordinarily the cycle of testing extends over a considerable period of time, consisting of a heating interval, a heat-holding interval, and a cooling interval. The testing temperatures are frequently in excess of 850° F.; and the cycle of testing 28 hours and longer and comprising, for example, 12 hours heating, 3 to 4 hours holding, and 12 hours cooling.

A successful measurement of the surface temperatures of such rotating bodies at the required locations present certain problems. A common practice is to use various types of copper shoe collectors into which the hot junction of a thermocouple is inserted. The successful employment of such a method depends entirely upon the patience and skill of the operator installing the copper shoe collectors. It is usually necessary for the operator to enter the furnace and, with considerable labor and inconvenience, wire the copper shoe collectors in place in order that they will ride the rotor evenly. In addition, the thermocouple lead wires must be carefully insulated throughout the installation. However, there is no assurance that after the furnace is closed and sealed, and the test started, that the copper collector shoes will not "cock-up" or that they will ride the prepared tracks throughout the test. Moreover, there is a constant danger of the lead wires burning out, breaking, or short-circuiting. Any of the foregoing conditions are a potential source of trouble which, if encountered, necessitate the stopping of the test, the tearing down and repairing of the apparatus, and repetition of the test; all of which is accompanied by a considerable waste of labor, fuel, power and time.

It is among the objects of the present invention to provide a thermocouple assembly which is particularly efficient when used in connection with rotors, such as shafts, steam turbine forgings, etc.

Another object is the provision of an assembly of the class described which will not be accompanied by the disadvantages referred to hereinbefore.

Still another object is to provide a thermocouple assembly for use on rotors which is easy and inexpensive to manufacture, install and operate.

The invention, then, comprises the features hereinafter fully described and as particularly pointed out in the claim, the following description and the annexed drawing setting forth in detail the certain illustrative embodiments of the invention, this being indicative of but one of the number of ways in which the principles of the invention may be employed.

In the annexed drawing:

Figure 1 is a sectional elevation showing a furnace embodying the device of the present invention;

Figure 2 is an enlarged sectional side elevation of the device; and

Figure 3 is a section on the line III—III of Figure 2.

Referring more particularly to the drawing, the numeral 2 diagrammatically designates a rotor which is mounted for rotation. Around the rotor 2, or that portion thereof which is to be given a "heat indication test," the furnace 3 is supplied with heat in any well-known manner.

According to the teachings of the present invention, it is desired to insert a thermocouple into the furnace 3. For this purpose there is provided a steel tube or clamping case 5. This clamping case 5 is supported on the exterior of the furnace 2 by means of angles 7. Within the clamping case 5, and extending entirely therethrough, is a steel stem 9 having an intermediate portion 9$^a$ of increased diameter. At the end of the steel clamping case 5, which is on the outside of the furnace 3, there is provided a brass bushing 10 between which and the adjacent end of the portion 9$^a$ of increased diameter of the tube 9 there is a steel coil spring 12 which operates to bias the enlarged intermediate portion 9$^a$ of the steel stem 9 inwardly of the steel clamping case.

The inner end of the steel stem 9 projects through a brass bushing 14 carried in the adjacent end of the steel clamping case 5. This end of the stem 9 is extended for a slight distance beyond the bushing 14 and carries in screw threaded engagement a steel nut 15, the outer end of which is provided with a tip 16 of "stellite" or other suitable wear-resistant material. The steel nut 15 provides an interior recess 17 within which the ends of the thermocouple wires are intertwisted in a manner well known to the art, shown at X, and welded, as shown at Y.

Within the steel stem 9 there is disposed a series of porcelain insulator bushings 20 extending the entire length thereof and providing a passage for the thermocouple wires which are of dissimilar metals. For example, the upper wire, designated at 22, may be iron, while the lower wire 23 may be composed of "constantan." The outer ends of the wires 22 and 23 pass through a fiber bushing 25 in the outer end of the steel stem 9 and are included in a suitable pyrometer circuit (not shown).

Referring more particularly to Figure 2, it will be noted that adjacent each end of the clamping case 5, the wall thereof is provided with an aperture, as at 28. The brass bushings 10 and 14 are also apertured, as shown at 29, whereby a clamping screw 30 may be extended through these apertures to secure these elements in position.

The steel stem 9 is free to move in adjusting itself, against the resistance of the steel spring 12, when the diameter of the rotor 2 changes due to thermal expansion. The steel spring 12 thrusts the steel stem 9 into the furnace 3 in such manner that the wear-resistant end 16 of the nut 15 is in contact with the surface of the rotor 2 at all times.

While I have shown and described one specific embodiment of the present invention, it will be seen that I do not wish to be limited exactly thereto, since various modifications may be made without departing from the scope of the invention, as defined by the following claim.

I claim:

A thermocouple assembly for determining the surface temperature of a heated body rotating within a vessel, said thermocouple assembly comprising an elongated tube adapted to extend at least partially through said vessel, an elongated tube slidably mounted in said first-named tube and disposed with one of its ends projecting therefrom, thermocouple elements leading through said second-named tube, the hot-junction of said thermocouple elements being disposed at the projecting end of said second-named tube, a wear-resistant element carried on the projecting end of said second-named tube, said wear-resistant element being in thermal contact with the hot-junction of said thermocouple elements, spring means normally urging the projecting end of said second-named tube outwardly with respect to said first-named tube whereby said wear-resistant element may be resiliently held in contact with the heated rotating body aforesaid, and abutting instrumentalities on said first-named tube and said second-named tube for limiting the urged movement of the latter.

ROBERT O. THOMAS.